United States Patent [19]

Codrington

[11] 4,291,657

[45] Sep. 29, 1981

[54] DIESEL ENGINE SPEED GOVERNOR

[76] Inventor: Ernest R. Codrington, 1580 Cornell Ave., Coquitlam, British Columbia, Canada, V3J 3A1

[21] Appl. No.: 961,523

[22] Filed: Nov. 17, 1978

[51] Int. Cl.[3] ........................ F02D 1/04; G05D 11/00

[52] U.S. Cl. .................................... 123/387; 123/368; 123/388; 137/115

[58] Field of Search ............ 123/140 FG, 139 E, 387, 123/388, 385, 375, 368, 357; 137/115, 119

[56] References Cited

U.S. PATENT DOCUMENTS

| | | | |
|---|---|---|---|
| 2,103,299 | 12/1937 | Raunsbeck | 137/115 |
| 2,910,975 | 11/1959 | Evans | 123/139 AQ |
| 3,640,258 | 2/1972 | Isobe | 123/140 FG |
| 3,699,939 | 10/1972 | Eckert | 123/140 FG |
| 3,741,182 | 6/1973 | Wade | 123/140 FG |

*Primary Examiner*—Charles J. Myhre
*Assistant Examiner*—Carl Stuart Miller
*Attorney, Agent, or Firm*—Fulwider, Patton, Rieber, Lee & Utecht

[57] ABSTRACT

A speed governor for a diesel engine having a fuel pump mechanically driven by the engine. The governor comprises a hydraulically activated valve. A first fuel line connects the valve to the fuel pump and a second fuel line connects the valve to the fuel injectors. The valve is activated by increasing fuel pressure to decrease the flow of fuel through the fuel lines and is activated by decreasing fuel pressure to increase the flow of fuel through the lines.

6 Claims, 4 Drawing Figures

Fig.1.
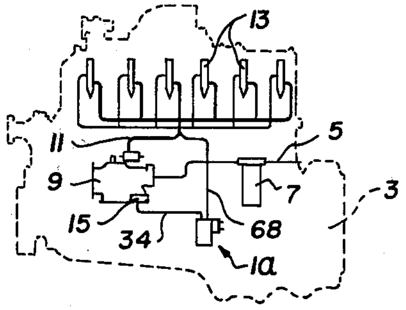
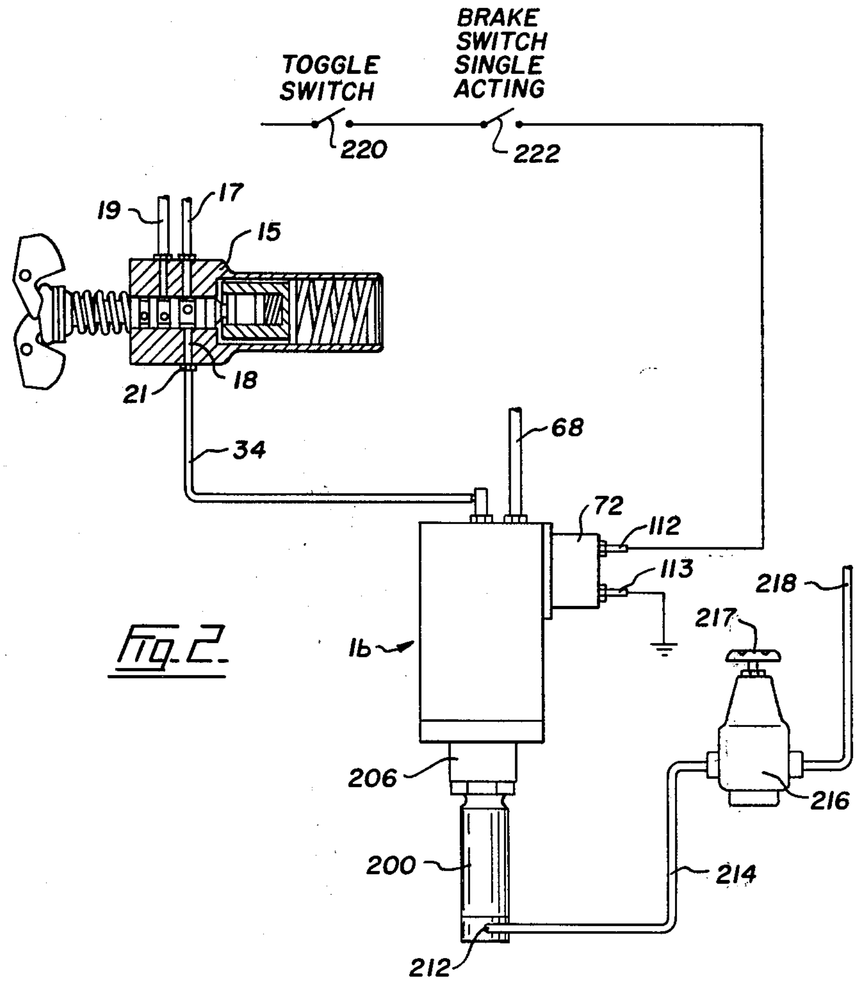
Fig.2.

DIESEL ENGINE SPEED GOVERNOR

BACKGROUND OF THE INVENTION

This invention relates to speed governors for a diesel engines.

Diesel engines, for example those used in large mining trucks, are commonly operated continuously between maintenance intervals. This means that the engine is left idling for appreciable periods. In order to avoid coking of the engine and to assure proper cooling, the engine must be left to idle at a higher speed than normal idle. A hand throttle is usually provided so that the operator can raise the idling speed when the engine is to be left unattended for a period of time.

However, due to warming of the engine and other factors, the idling speed can vary after the hand throttle has been set. This can result in the engine idling above or below the optimum speed. If the operator for a particular mining truck misses a shift, the truck to which he had been assigned may be left idling for the entire period until the next shift without being attended to. If the diesel engine speeds up after the hand throttle has set the high idle speed, the engine may be left racing for eight hours, resulting in damage to the engine.

Another problem with diesel powered highway vehicles is the use of the hand throttle to maintain a cruising speed. Should an emergency arise, the driver cannot stop the vehicle quickly due to the throttle being set. Although this practice by drivers is discouraged, it is still widespread.

SUMMARY OF THE INVENTION

The present invention overcomes these problems by providing a speed governor for a diesel engine having a fuel pump mechanically driven by the engine. The governor comprises a hydraulically activated valve means with a body. A fuel inlet is for connecting the valve means to the fuel pump. A fuel outlet is for connecting the valve means to the fuel injectors of the engine. The valve means is activated by increasing fuel pressure to decrease the flow of fuel from the inlet to the outlet and is activated by decreasing fuel pressure to increase the flow of fuel from the inlet to the outlet.

The valve means may comprise a valve piston slidable within a bore in the body and means for biasing the piston towards a first end of the bore. The fuel inlet is connected near the first end of the bore so increasing fuel pressure moves the piston away from the first end and decreasing fuel pressure allows the piston to move towards the first end of the bore.

A speed governor according to the present invention is suitable for a diesel engine having a mechanical fuel pump where increasing engine speed results in a higher fuel pump output and a higher pressure in the line providing fuel to the fuel injectors. Additionally, it is primarily intended for common rail type fuel injection systems where a single fuel line supplies fuel to all the injectors and not for fuel injection systems where each injector has, in effect, its own fuel system.

An advantage of the present invention is that the optimum high idle speed can be preset and the operator of the equipment can choose the high idle mode of operation of the engine by a simple on and off switch. Once the high idle mode has been selected, the governor comprises automatic means for maintaining the engine at the set speed. The governor is installed in the engine so that the normal idling at a reduced speed is resumed when the governor is switched off.

In drawings which illustrate embodiments of the invention:

FIG. 1 is a side elevational view of a diesel engine fitted with a speed governor according to a first embodiment of the invention;

FIG. 2 is a side elevational view showing the fuel line connection to the centrifugal governor of the engine and a speed governor according to a second embodiment of the invention;

DESCRIPTION OF THE PREFERRED EMBODIMENT

Figure 3:
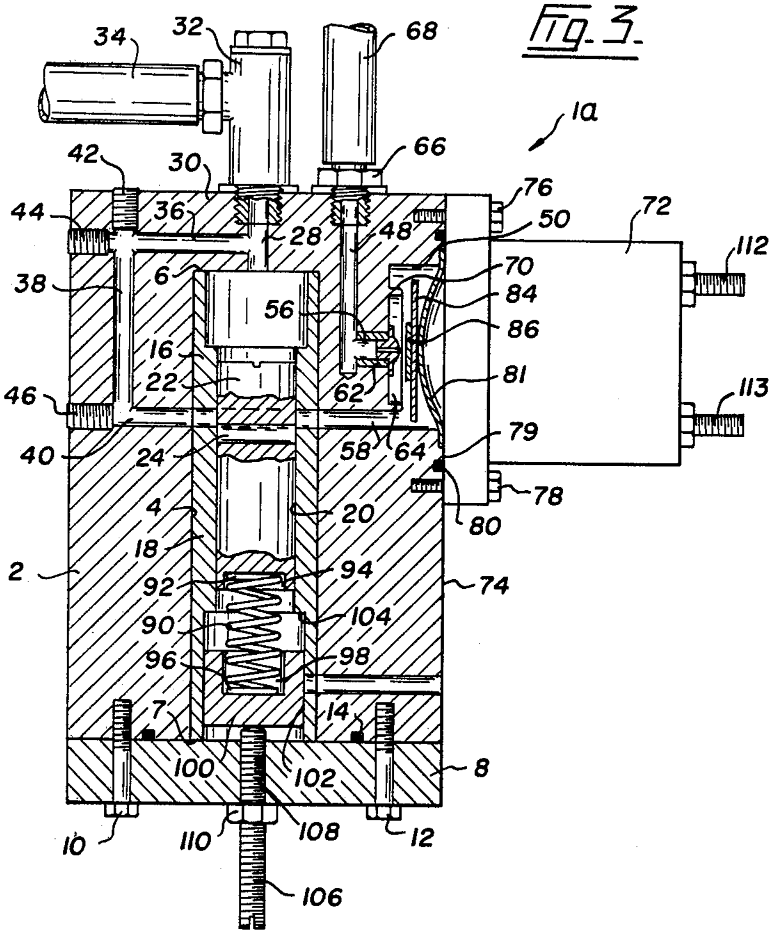
FIG. 3 is a sectional view showing the high idle speed governor according to the first embodiment of the invention.

FIG. 1 shows an engine speed governor 1*a* fitted between fuel lines 34 and 68 of diesel engine 3. Engine 3 is equipped with a fuel line 5 from the fuel tank which passes through a fuel filter 7 to a fuel pump 9. Fuel line 11 from the pump 9 supplies fuel to the engine through a common rail fuel injection system including a plurality of fuel injectors 13.

FIG. 2 shows the centrifugal governor 15 incorporated in the housing of fuel pump 9 shown in FIG. 1. By means of the governor 15, the supply of fuel passing into the governor through fuel line 17 and leaving through fuel line 19 is cut off when the engine speed reaches a predetermined limit. The fuel line 34 supplying fuel to the speed governor 1*b* according to the invention is supplied with fuel from fuel line 17 by means of a bore 18 made in the centrifugal governor and a fitting 21 connected thereto. Similar connections are used for governor 1*a*.

The governor 1*a* shown in FIG. 3 is adapted for regulating the high idle speed of a diesel engine. The governor 1*a* has a body 2, for example of cast aluminum, which is shown in section to reveal the internal components. The body 2 has a central longitudinal bore 4 extending from a first end 6 to a second end 7. The second end 7 is closed off by a plate 8 bolted to the body 2 by bolts 10 and 12. An O-ring 14 acts as a gasket to seal plate 8 against body 2. A tubular insert 16 is tightly fitted within bore 4 and extends from end 6 to end 7. Insert 16 is typically of steel or cast iron and includes a central portion 18 having central bore 20 of reduced diameter. A piston member 22, preferably of steel, is slidably received within bore 20. Piston 22 has a diametral bore 24 comprising a piston passageway for fuel which communicates at both ends with the outside of the piston.

Body 2 is provided with a bore 28 extending from end 6 of bore 4 to the end 30 of body 2. A threaded coupling 32, commonly used in fuel systems, is used to connect to the body 2 to a fuel line or conduit 34 connected to the fuel pump of a diesel engine. By means of coupling 32, fuel line 34 communicates with the bore 28 and end 6 of bore 4. Bore 28 provides a fuel inlet for body 2.

Three bores 36, 38 and 40 comprise an inlet portion of a fuel passageway in body 2 extending between fuel inlet or bore 28 and bore 4. Three plugs 42, 44, and 46 are used to seal the outer ends of bores 38, 36 and 40 after they have been drilled.

Body 2 is also provided with a cylindrical recess 50 extending inwardly from side 74 of body 2. Bore 48 extends downwardly from end 30 of body 2 to provide a fuel outlet for the body and communicates with recess 50 through bore 56. A bore 58 extends inwardly from recess 50 to communicate with bore 20 diametrically opposite bore 40. A second threaded coupling 66 is used to connect bore 48 to a second fuel line 68 connected to the fuel injectors 13 of the engine 3 as shown in FIG. 1.

An orifice insert 62 is threadedly received in bore 56 adjacent two recess 50. A ring-like protrusion 70 on end 64 of recess 50 extends about orifice insert 62. Bores 48 and 56, insert 62, recess 50 and bore 58 comprise an outlet portion of the fuel passageway in body 2.

A solenoid coil 72, for example Cummins Diesel Part No. 134072 for twelve volt systems, is connected to side 74 of body 2 by bolts 76 and 78. An O-ring 80 is used to seal coil 72 against the body 2. In this position, coil 72 seals the open end of recess 50. Located within recess 50 and connected to end 79 of coil 72 is a steel diaphragm 81. A steel disc 84 is connected to diaphragm 81 and has a resilient disc 86 adjacent orifice insert 62. Resilient disc 86 is preferably of buna or rubber.

Located between end 7 of bore 4 and piston member 22 is a coil spring 90. A first end 92 of spring 90 is located within recess 94 of piston member 22. Second end 96 of spring 90 is located within recess 98 of spring seat 100. Spring seat 100 is slidable within bore 102 of insert 18 which has a diameter greater than bore 20, forming a shoulder 104 therebetween.

A threaded screw 106 extends through tapped bore 108, centrally located on plate 8, to contact spring seat 100. A thumb nut 110 is fitted on screw 106 for adjusting the amount of member 106 protruding into bore 4.

In operation, a voltage is applied across terminals 112 and 113 of solenoid coil 72 by the operator closing a switch in the cab of the vehicle. The magnetic force developed by solenoid coil 72 moves diaphragm 31 towards the coil 72 and raises disc 86 from orifice insert 62.

The fuel entering bore 4 through fuel line 34, connector 32 and bore 28 exerts a pressure upon piston member 22 and forces it against spring 90. Screw 106 is adjusted to determine the pressure of fuel against piston member 22 that will deflect the piston member to the position shown in broken lines where bore 24 is aligned with bores 40 and 58. In this position, there is a full flow of fuel from fuel line 34, through threaded connector 32, bores 28, 36, 38 and 40, piston bore 24, bore 58, recess 50, orifice insert 62, and bore 48 to threaded connector 66 and out fuel line 68.

If the engine speed increases beyond the set level, then the mechanical fuel pump is driven faster and produces an increased pressure of fuel entering governor 1*a* from fuel line 34. This results in a deflection of piston member 22 towards the position shown in solid lines and a misalignment of bore 24 of piston member 22 with bores 40 and 58, resulting in decreased flow of fuel from fuel line 34 to fuel line 68 and into the engine. The decreased flow of fuel results in a slower engine speed. When the engine speed has been reduced to the set level, the pressure of the fuel entering bore 4 through fuel line 34 will be reduced and allow spring 90 to move piston member 22 towards the position shown in broken lines and the flow of fuel through the governor 1*a* is increased. In this way, governor 1*a* operates to regulate the high idle speed of the diesel engine. The piston member 22 is biased by spring 90 and threaded member 106 to increase the flow of fuel through bore 20 when the fuel pressure decreases and to decrease the flow of fuel through bore 20 when the fuel pressure increases.

When the operator wishes to stop the high idle mode of operation of the diesel engine, he simply opens the switch in the cab, cutting off the voltage applied to terminals 112 and 113 of solenoid coil 72. Diaphragm 81 is then free to move outwardly away from coil 72 until disc 86 closes off orifice insert 62. The flow of fuel through fuel line 68 is thus stopped. During movement of diaphragm 81, the ring-like protrusion 52 provides means for limiting the tipping of disc 84 and thus assures proper contact of the disc 86 with the orifice insert 62.

If it is desired to raise the high idle speed, then it is simply necessary to turn member 106 in disc 8. This moves spring seat 100 upwardly and increases the tension of spring 90. Consequently, a higher fuel pressure against piston member 22 is necessary to move the piston member out of aligment with bores 40 and 58 towards the position shown in solid lines. To reduce the high idle speed, the procedure is reversed and member 106 is threaded outwardly from disc 8, reducing the tension of spring 90.

Figure 4:
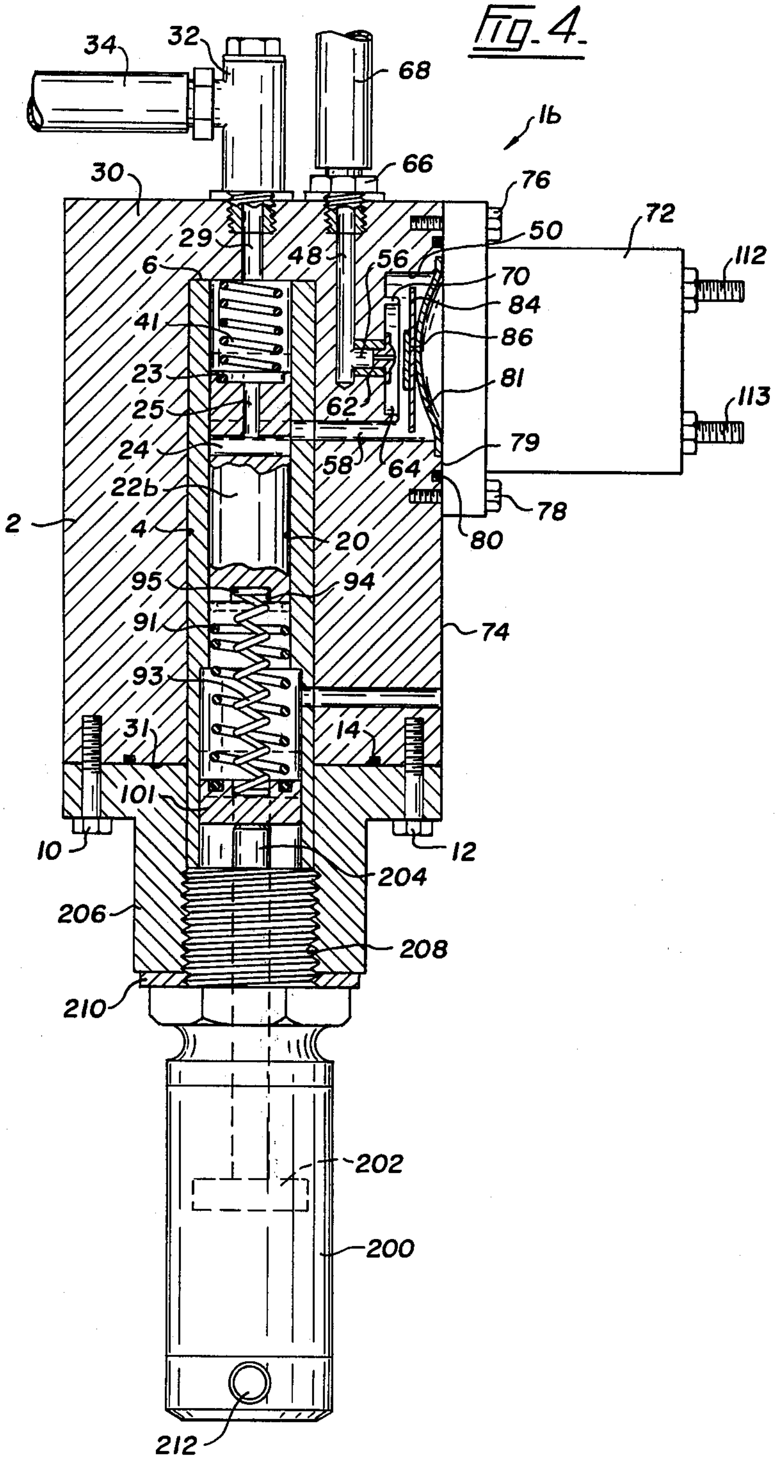
FIG. 4 is a sectional view of the second embodiment of the invention including a cruise control feature for use on highway vehicles.

The governor 1*b* shown in FIG. 4 is generally the same as governor 1*a* shown in FIG. 3 and will be described only with reference to the differences therebetween. Firstly, governor 1*b* has a fuel passageway with a different inlet portion. For this embodiment, the inlet portion of fuel passageway comprises a single bore 29 which is equivalent to bore 28 of FIG. 3. The construction of the governor is consequently simplified. However, in order to accommodate this simplification, an axial bore 25 is made from the top of the piston member 22*b* to communicate with the horizontal bore 24. The fuel flows downwardly from inlet 29, through bore 20, through bores 25 and 24 in piston member 22*b* and then into bore 58. The flow of fuel increases the more closely bore 24 is aligned with bore 58. While this simplification is desirable, it should be noted that the pressure of the fuel on the top of piston member 22*b* increases as the flow of fuel between bore 24 and bore 58 is restricted. Similarly, as the flow increases between bores 24 aand 58, the pressure on member 22*b* decreases. This results in "bouncing" of member 22*b* and a rough idle for the engine. To compensate for this, an additional coil spring 41 is compressed between end 6 of bore 4 and the recess 23 in the top member 22. Spring 41 smooths out the idle. Obviously, for the governor 1*b* to work properly, spring 41 must be appreciably less in compressive strength than the coil spring 93 which has a top end 95 compressed against recess 94 in the bottom of piston member 22*b*.

As described so far, governor 1*b* is adapted to regulate the high idle speed of a diesel engine. However, governor 1*b* is also adapted to govern the cruising speed of a highway vehicle powered by such a diesel engine. For this purpose, a small pneumatic cylinder 200 with a piston 202 and an upwardly extending piston rod 204 is connected to the bottom 31 of the body 30 of the governor. The cylinder 200 has an upper threaded portion 208 threadedly received within a corresponding female threaded flange 206 which replaces plate 8 of governor 1*a*. An Oring 210 is compressed between flange 206 and cylinder 200. When compressed gas is supplied to opening 212 at the bottom of cylinder 200, piston 202 and rod 204 move upwardly until rod 204 contacts spring seat 101. It may be seen that governor 1*b* has an inside coil spring 93 and an outside coil spring 91 replacing the single spring 90 of governor 1*a*. When cylinder 200 is not pressurized and the end of rod 204 is at the lower limit shown in solid lines, governor 1*b* operates in the same manner as governor 1*a* with spring 93 alone. As shown in solid lines in FIG. 4, spring 91 has an uncompressed length less than spring 93 and does not normally contact piston member 22. However, when pressurized gas is supplied to opening 212, piston 202 and rod 204 move upwardly and rods 204 moves seat 101 upwardly until spring 93 contacts the bottom of piston member 22*b* as shown in broken lines. The greater spring force adapts governor 1*b* for regulating the cruising speed of a vehicle. As springs 91 and 93 are compressed by the upward movement of rod 204 against seat 101, springs 91 and 93 exert an increasing force against the bottom member of 22. Consequently, the greater the pressure of gas supplied through opening 212, the greater the pressure of fuel required from line 34 to act against the top of member 22 to move bore 24 downwardly out of alignment with bore 58.

FIG. 2 illustrates the control system for governor 1*b*. A pneumatic line 214 connects opening 212 in cylinder 200 to a pneumatic regulator 216. Another pneumatic line 218 connects the regulator 216 to a suitable source of pressurized air, for example the air brake system of the vehicle. Regulator 216 should be located within the cab of the vehicle at a convenient position so the driver can turn the knob 217. If the driver wishes to set the vehicle at an automatically regulated cruising speed, he simply opens regulator 216 by turning knobs 217. As knob 217 is turned, compressed air of increasing pressure is applied against piston 202, pushing rod 204 against spring seat 101. This provides an upward force against member 202 and means that increased fuel pressure from line 34 will be required to move member 22 downwardly so bore 24 is not aligned with bore 58. As the pressure of gas against piston 202 increases, fuel of increasing pressure can pass through governor 1*b*. Consequently, the driver simply turns knob 217 until a sufficient amount of fuel passes from line 34 to line 68 through governor 1*b* to maintain a desired speed of the vehicle. Should the vehicle encounter greater resistance due to road inclination or wind resistance, the engine will tend to slow down, slowing the fuel pump and lowering the fuel pressure supplied to line 34. Springs 91 and 93 can then push member 22 upwardly to more closely align bores 24 and 58 and allow a greater volume of flow through governor 1*b* to increase the flow of fuel to the engine and maintain the speed. Should the resistance decrease, the engine will begin to speed, and the pressure of fuel from the fuel pump will increase. This will move piston member 22 downwardly against springs 91 and 93 and move bores 24 and 58 out of alignment, reducing the volume of fuel flowing through governor 1*b*. This will reduce the amount of fuel supply to the engine to prevent the speed of the vehicle from increasing.

To operate governor 1*b*, a toggle switch 220 is provided to supply power across terminals 112 and 113 to permit the flow of fuel through insert 62. A single acting brake switch 222 is provided to open the circuit across terminals 112 and 113 should the driver depress the brake pedal. This is required as a safety measure. Switch 222 is provided with a manual reset button to close the switch again when the driver desires.

What I claim is:

1. A fast idle speed governor for a diesel engine having a fuel pump mechanically driven by the engine and a common rail fuel injection system, the governor comprising:

a valve body having a fuel inlet and a fuel outlet;

a bore within the body communicating adjacent a first end of the bore with the fuel inlet;

a valve piston slidable within the bore under the influence of pressure of fuel entering the inlet;

a passageway in the piston able to move, with sliding of the valve piston, between a first position that allows fuel to flow from the fuel inlet, through the passageway to the fuel outlet to a position where no fuel flows;

a control valve within the valve body movable between a closed position where fuel cannot flow through the governor to an open position where fuel can flow;

means to open and close the control valve;

variable control means biasing the valve piston to define the first position for the valve piston and thus to set the fast idel of a diesel engine at a predetermined speed;

a fluid cylinder connected to the body near a second end of the bore opposite the first end, the cylinder being axial with the bore and having an internal piston anda piston rod connected to the internal piston extending towards the bore, the variable control means for biasing the valve piston being between the rod and the valve piston so that the flow of fuel from the outlet increases when the rod moves towards the valve piston and the flow of fuel decreases when the rod moves away from the valve piston, said control means for biasing the valve piston comprising axial first and second coil springs, the second spring being shorter than the first spring, the first spring being compressed betwen the rod and the valve piston when the internal piston is in a position distal the valve piston, the second spring being compressible between the rod and the valve piston when the internal piston is in a position proximate the valve piston increasing the pressure of fuel from the fuel inlet required to decrease the flow of fuel from the inlet to the outlet.

2. A governor as claimed in claim 1, in which the variable control means comprises a spring compressed between the piston and a second end of the bore, opposite the first end, and means for adjusting tension of the spring to vary the fuel pressure at which the piston starts to move from the first postion.

3. A governor as claimed in claim 2, the spring comprising a coil spring with a first end contacting the piston and a second end contacting the means for adjusting the tension, the means for adjusting comprising a male threaded element extending through a tapped aperture in the body of the valve means axial with the bore.

4. A governor as claimed in claim 1 in which the control valve is a solenoid activated shut off valve.

5. A governor as claimed in claim 4, the shut off valve including an orifice for the fuel passageway.

6. A governor as claimed in claim 4 in which the solenoid valve is mounted directly on the valve body.

* * * * *